US012782671B2

(12) United States Patent
Gong et al.

(10) Patent No.: US 12,782,671 B2
(45) Date of Patent: Nov. 3, 2026

(54) ZOOM LENS ASSEMBLY

(71) Applicant: ZHONGSHAN UNION OPTECH RESEARCH INSTITUTE CO., LTD., Zhongshan (CN)

(72) Inventors: Junqiang Gong, Zhongshan (CN); Meijiao Zhao, Zhongshan (CN); Kun Li, Zhongshan (CN); Shengping Qiu, Zhongshan (CN)

(73) Assignee: ZHONGSHAN UNION OPTECH RESEARCH INSTITUTE CO., LTD., Zhongshan (CN)

( * ) Notice: Subject to any disclaimer, the term of this patent is extended or adjusted under 35 U.S.C. 154(b) by 297 days.

(21) Appl. No.: 18/643,310

(22) Filed: Apr. 23, 2024

(65) Prior Publication Data

US 2025/0327987 A1 Oct. 23, 2025

(51) Int. Cl.

| | |
|---|---|
| ***G02B 7/04*** | (2021.01) |
| ***G02B 7/28*** | (2021.01) |
| ***G03B 5/00*** | (2021.01) |

(52) U.S. Cl.

CPC ................. *G02B 7/04* (2013.01); *G02B 7/28* (2013.01); *G03B 5/00* (2013.01); *G03B 2205/0069* (2013.01)

(58) Field of Classification Search

CPC . G02B 7/04; G02B 7/28; G02B 7/102; G03B 5/00; G03B 2205/0069

See application file for complete search history.

(56) References Cited

U.S. PATENT DOCUMENTS

| | | | | |
|---|---|---|---|---|
| 4,536,071 | A * | 8/1985 | Maekawa | G03B 17/14 396/132 |
| 4,956,657 | A * | 9/1990 | Shintani | G03B 17/14 396/137 |
| 10,698,224 | B1 * | 6/2020 | Cooke | G02B 7/09 |
| 2008/0106811 | A1 * | 5/2008 | Eromaki | H04M 1/0264 359/817 |
| 2014/0063627 | A1 * | 3/2014 | Mueller | G02B 7/023 359/813 |
| 2017/0374248 | A1 * | 12/2017 | Eromaki | H04N 23/54 |
| 2024/0236463 | A1 * | 7/2024 | Zhou | G03B 30/00 |

* cited by examiner

*Primary Examiner* — Balram T Parbadia

(74) *Attorney, Agent, or Firm* — Westbridge IP LLC

(57) ABSTRACT

Disclosed is a zoom lens assembly. The zoom lens assembly includes a fixing cartridge, at least one mobile group, a driving mechanism, a position detection device, a limiting mechanism, and a control device. The mobile group has a self-locking position during a movable stroke. The driving mechanism is configured to drive the mobile group to move forward and backward. The position detection device is configured to detect a relative position of the mobile group and the fixing cartridge in real time. The limiting mechanism includes a limiting portion provided movably. The limiting portion has a locking position and an unlocking position during a movable stroke, in the locking position, the limiting portion is configured to limit the mobile group to the self-locking position, and in the unlocking position, the limiting portion is configured to avoid the mobile group.

9 Claims, 4 Drawing Sheets

ZOOM LENS ASSEMBLY

TECHNICAL FIELD

The present application relates to the technical field of zoom lens locking structures, and in particular, to a zoom lens assembly.

BACKGROUND

In a lens driven by a voice coil motor (VCM), when the zoom group or focus group has completed zooming or focusing, in order to prevent the zoom group from moving to the collision point of the mechanism, it needs to be locked to prevent it from moving. If there is a large impact, the lens may be shattered or deformed by a head-on collision.

SUMMARY

The main purpose of the present application is to provide a zoom lens assembly, which aims to solve the problem that existing lenses driven by a voice coil motor (VCM) are easily broken and the collision point is easily deformed.

In order to achieve the above purpose, the present application provides a zoom lens assembly, including:

a fixing cartridge, provided with an installation cavity extending in a front-rear direction;

at least one mobile group, configured to install a lens and movably installed in the fixing cartridge in the front-rear direction, where the mobile group has a self-locking position during a movable stroke;

a driving mechanism, configured to drive the mobile group to move forward and backward;

a position detection device, configured to detect a relative position of the mobile group and the fixing cartridge in real time;

a limiting mechanism, provided in the fixing cartridge and including a limiting portion provided movably, where the limiting portion has a locking position and an unlocking position during a movable stroke, in the locking position, the limiting portion is configured to limit the mobile group to the self-locking position, and in the unlocking position, the limiting portion is configured to avoid the mobile group; and a control device, electrically connected to the driving mechanism, the position detection device and the limiting mechanism, and configured to control the driving mechanism and the limiting mechanism to work according to the position detection device.

In some embodiments, the limiting portion is provided on a side of the mobile group, the limiting portion is rotatably provided around a rotation axis extending in the front-rear direction, and the limiting portion is configured to switch between the locking position and the unlocking position during a rotation stroke; and the limiting portion is recessed with a clamping groove with a notch facing the mobile group, and the clamping groove is configured to clamp the mobile group when the mobile group moves to the self-locking position.

In some embodiments, the limiting mechanism further includes:

an installation base;

a limiting shaft, extending along the front-rear direction and rotatably mounted on the installation base to rotate around the rotation axis extending along the front-rear direction, where a periphery of the limiting shaft protrudes outward to form two beams spaced apart in the front-rear direction, the clamping groove is formed between the two beams, and the limiting shaft is configured to form the limiting portion; and a driving mechanism, drivingly connected to the limiting shaft to drive the limiting shaft to rotate.

In some embodiments, the periphery of the limiting shaft is provided with transmission teeth;

the driving mechanism includes:

a motor provided with an output shaft extending in an up-down direction; and, a worm extending in the up-down direction and coaxially connected to the output shaft, where the worm is meshed with the transmission teeth to form a worm gear structure.

In some embodiments, the zoom lens assembly further includes a buffer structure provided in the fixing cartridge, where the buffer structure includes at least one buffer portion, the buffer portion is provided on one of the installation cavity and the mobile group to provide buffering when the mobile group moves forward and backward.

In some embodiments, at least one of a front end surface of the mobile group and a front end wall of the installation cavity is provided with the buffer portion; and/or, at least one of a rear end surface of the mobile group and a rear end wall of the installation cavity is provided with the buffer portion.

In some embodiments, the buffer portion includes a foam.

In some embodiments, the mobile group includes a main body and a first protruding column protruding from at least one end surface of the main body in the front-rear direction, and the first protruding column is provided correspondingly to the buffer portion; and/or, a second protruding column is configured to protrudes from at least one end wall of the installation cavity in a front-rear direction, and the second protruding column is provided correspondingly to the buffer portion.

In some embodiments, the position detection device includes a detection part and a sensing part, one of the detection part and the sensing part is directly or indirectly fixed to the fixing cartridge, and the other of the detection part and the sensing part is directly or indirectly fixed to the mobile group.

In some embodiments, the driving mechanism includes a driving coil and a magnet structure, one of the fixing cartridge and the mobile group is directly or indirectly fixedly connected to the driving coil, the other of the fixing cartridge and the mobile group is directly or indirectly fixedly connected to the magnet structure, and the driving coil is located in a magnetic field of the magnet structure and is configured to generate an electromagnetic driving force with the magnet structure when the driving coil is energized.

In the technical solution provided by the present application, the mobile group are driven to move by the electromagnetic driving force generated by the driving mechanism. The position detection device adopts closed-loop control and can detect the position of the mobile group in real time during the forward and backward movement of the mobile group. When the driving mechanism is not working, the driving mechanism does not exert force on the mobile group. If it is necessary to lock the mobile group, when the position monitoring device detects that the mobile group reaches the self-locking position, the control device controls the limiting mechanism to operate so that the limiting portion can switch from the unlocking position to the locking position. In this way, the mobile group can be limited to the self-locking position to prevent the mobile group from sliding freely in the fixing cartridge and colliding with the fixing cartridge. If it is necessary for the mobile group to move and work, the control device controls the limiting portion to switch to the unlocking position to avoid the mobile group, so as to solve the problem that existing lenses driven by a VCM are easily broken and the collision point is easily deformed.

BRIEF DESCRIPTION OF THE DRAWINGS

In order to more clearly illustrate the technical solutions in the embodiments of the present application or in the related art, a brief introduction will be given to the accompanying drawings required in the description of the embodiments or the related art. Obviously, the accompanying drawings in the following description are only some embodiments of the present application. For those skilled in the art, other accompanying drawings can be obtained based on the structures shown in these drawings without any creative effort.

FIG. 3 is a schematic structural view of a limiting mechanism and a mobile group in

FIG. 2.

Figure 1:
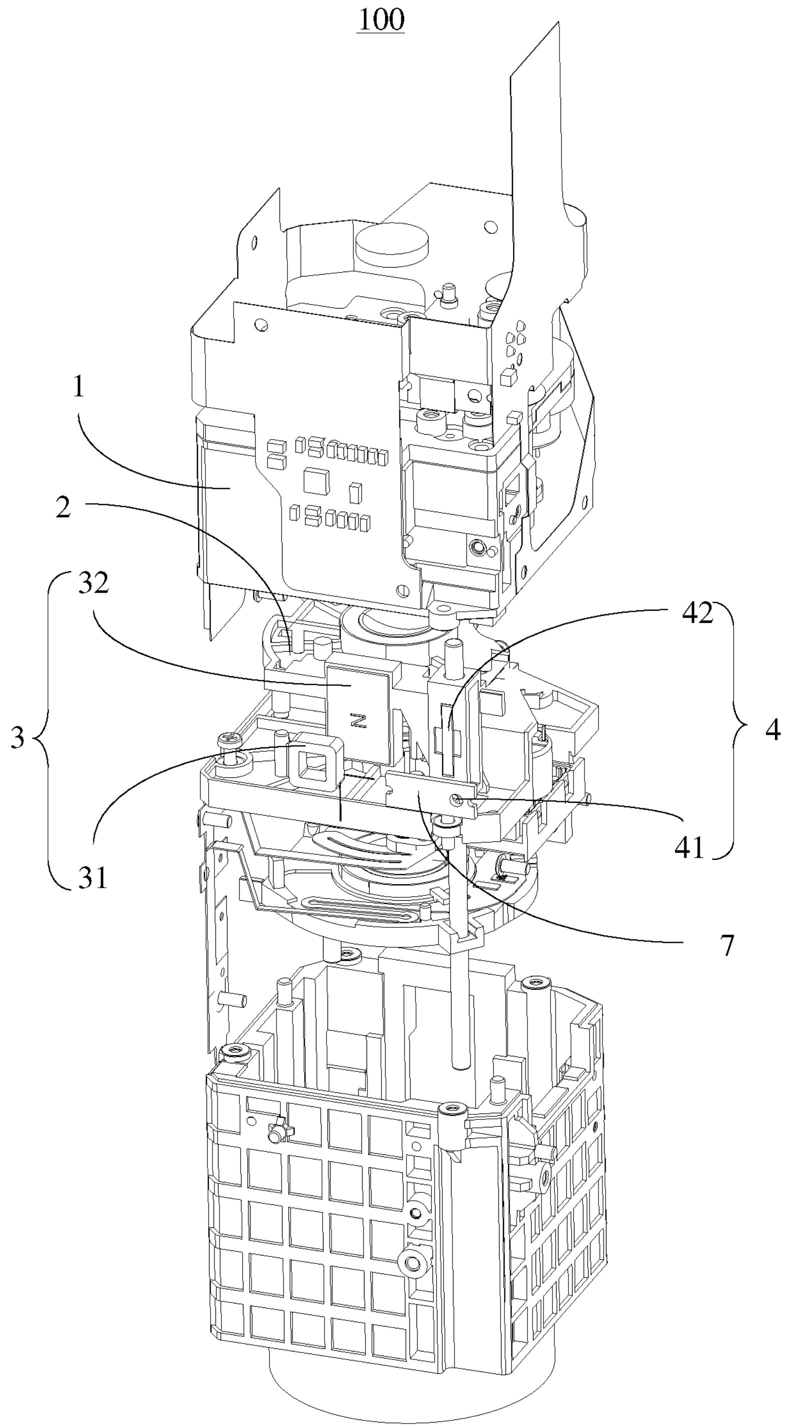
FIG. 1 is a schematic exploded view of a zoom lens assembly according to some embodiments of the present application.

The realization of the purpose, functional characteristics and advantages of the present application will be further described with reference to the accompanying drawings in combination with embodiments.

DETAILED DESCRIPTION OF THE EMBODIMENTS

The technical solutions of embodiments of the present application will be clearly and completely described with reference to the drawings in the embodiments of the present application. Obviously, the described embodiments are only some rather than all of the embodiments of the present application. Based on the embodiments of the present application, all other embodiments obtained by those skilled in the art without creative efforts shall fall within the scope of the present application.

It should be noted that if there are directional indications (such as up, down, left, right, front, rear, etc.) in the present application, the directional indications are only used to explain the relative positional relationship, movement situation, etc. among components in a specific attitude (as shown in the drawings). If the specific attitude changes, the directional indication also changes accordingly.

In addition, the descriptions related to “first”, “second” and the like in the present application are merely for descriptive purposes, and should not be understood as indicating or implying their relative importance or implicitly indicating the number of technical features indicated. Therefore, the features defined by “first” and “second” may explicitly or implicitly include at least one such feature. In addition, “and/or” in the whole text includes three solutions, taking A and/or B as an example, including A technical solution, or B technical solution, or a technical solution that both A and B meet. Besides, the technical solutions among various embodiments can be combined with each other, but the combination must be based on what can be achieved by those skilled in the art. When the combination of technical solutions is contradictory or cannot be achieved, it should be considered that such combination does not exist, and is not within the scope of the present application.

In a lens driven by a voice coil motor (VCM), when the zoom group or focus group has completed zooming or focusing, in order to prevent the zoom group from moving to the collision point of the mechanism, it needs to be locked to prevent it from moving. If there is a large impact, the lens may be shattered or deformed by a head-on collision.

In order to solve the above problems, the present application provides a zoom lens assembly. FIG. 1 to FIG. 7 show specific embodiments of the zoom lens assembly provided by the present application.

Figure 2:
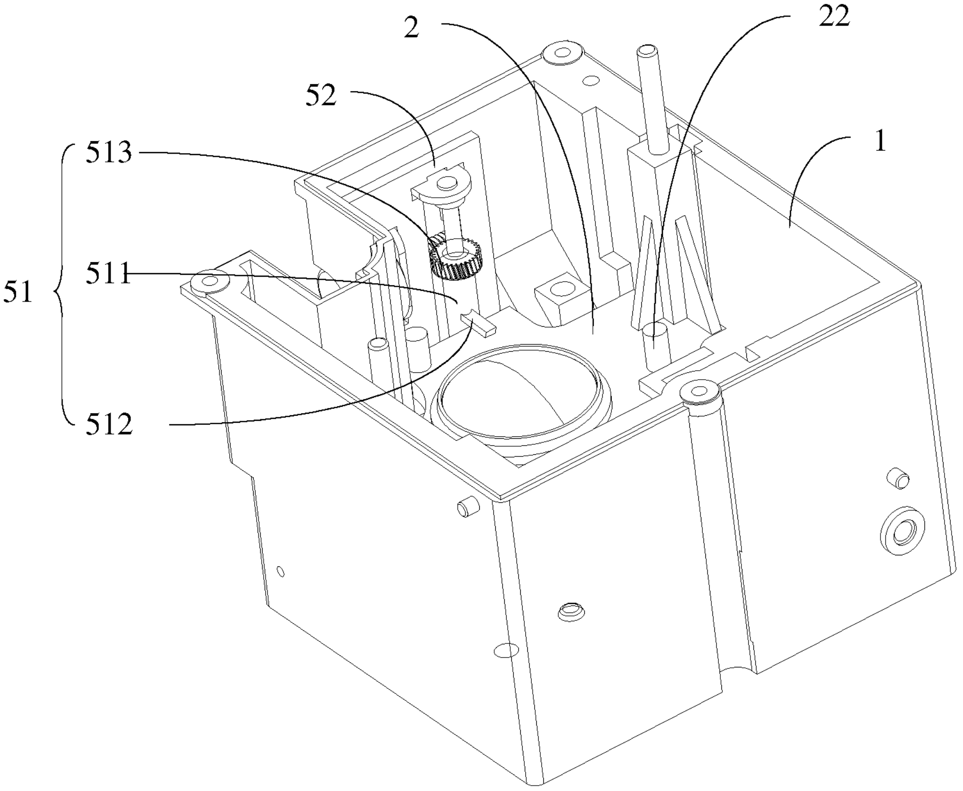
FIG. 2 is a schematic structural view of a part of the zoom lens assembly in FIG. 1.
Figure 3:
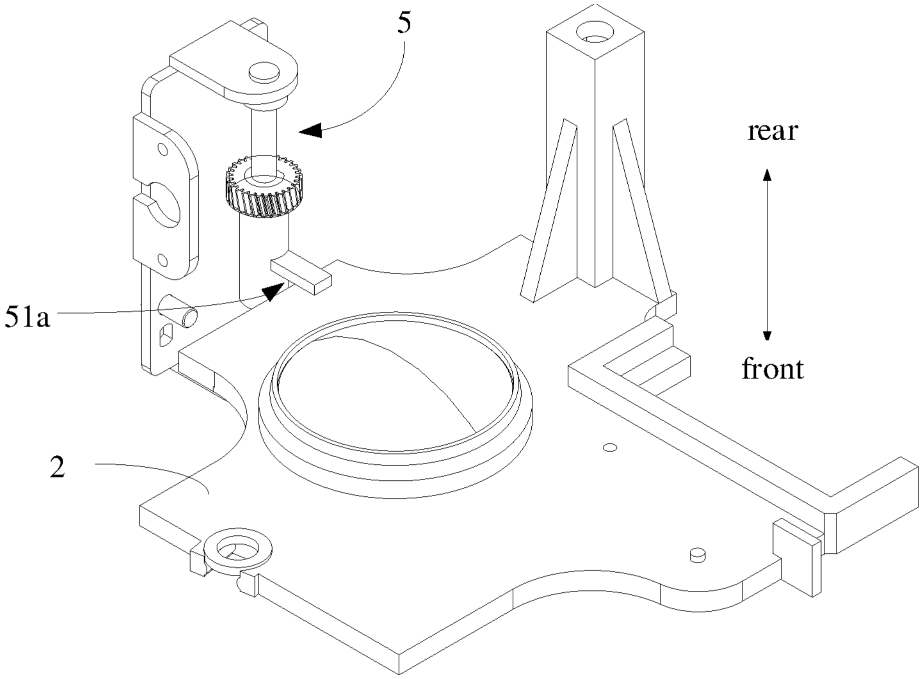
Figure 4:
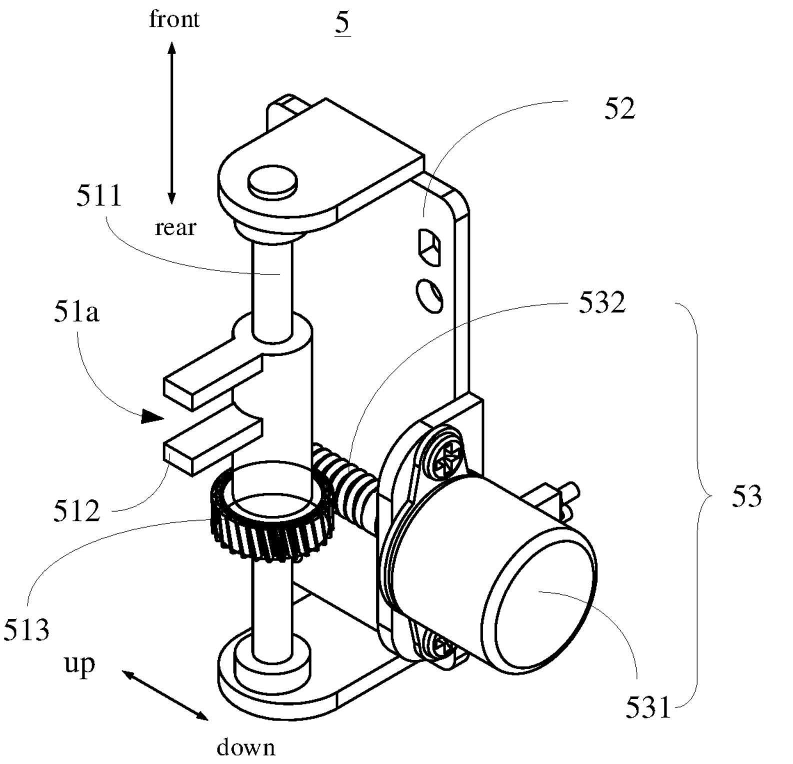
FIG. 4 is a schematic structural view of the limiting mechanism in FIG. 2.

As shown in FIG. 1 to FIG. 3, the zoom lens assembly 100 includes a fixing cartridge 1, at least one mobile group 2, a driving mechanism 3, a position detection device 4, a limiting mechanism 5 and a control device. The fixing cartridge 1 is provided with an installation cavity extending in a front-rear direction. The mobile group 2 is configured to install a lens and movably installed in the fixing cartridge 1 in the front-rear direction. The mobile group 2 has a self-locking position during a movable stroke. The driving mechanism 3 is configured to drive the mobile group 2 to move forward and backward. The position detection device 4 is configured to detect a relative position of the mobile group 2 and the fixing cartridge 1 in real time. The limiting mechanism 5 is provided in the fixing cartridge 1 and includes a limiting portion 51 provided movably. The limiting portion 51 has a locking position and an unlocking position during a movable stroke. In the locking position, the limiting portion 51 is configured to limit the mobile group 2 to the self-locking position, and in the unlocking position, the limiting portion 51 is configured to avoid the mobile group 2. The control device is electrically connected to the driving mechanism 3, the position detection device 4 and the limiting mechanism 5, and is configured to control the driving mechanism 3 and the limiting mechanism 5 to work according to the position detection device 4.

It should be noted that there may be one or a plurality of mobile groups 2. When the plurality of mobile groups 2 need to be locked and unlocked, a plurality of limiting mechanisms 5 may be provided correspondingly. One limiting mechanism 5 is for locking one of the mobile groups 2. In addition, a plurality of limiting portions 51 may be provided, and each limiting portion 51 is for locking one of the mobile groups 2, which can be designed according to actual conditions, and is not limited in the embodiments of the present application.

It should be noted that, based on the closed-loop real-time feedback of position information from the position detection device 4, high-speed drive control can be performed through the driving mechanism 3 to increase the rotation speed and use proportional-integral-derivative (PID) to balance the real-time position. The position detection device 4 can timely detect the position deviation of the driving mechanism 3, control the driving mechanism 3 to continue working through the control device in time, and adjust the position of the mobile group 2, which can effectively increase the zoom/focus speed of the mobile group 2. It should also be noted that based on the above closed-loop control, since the position detection device 4 can feedback position information in real time, even if there is a momentary inaccuracy in the driving mechanism 3, the PID control algorithm can be used to make the mobile group 2 reach the target location.

The control device adjusts the position of the mobile group 2 in real time based on the displacement difference between the actual position and the target position of the lens group. In addition, the driving mechanism 3 does not have problems with the physical accuracy and wear accuracy of the product itself. When the driving mechanism 3 drives the mobile group 2 at high speed, it is not affected by poor stopping accuracy, so that the mobile group 2 can accurately reach the target position required for zooming or focusing.

In the technical solution provided by the present application, the electromagnetic driving force generated by the driving mechanism 3 is used to drive the movement of the mobile group 2. The position detection device 4 adopts closed-loop control and can detect the position of the mobile group 2 in real time when the mobile group 2 moves in the forward and backward directions. When the driving mechanism 3 is not working, the driving mechanism 3 does not exert force on the mobile group 2. If it is necessary to lock the mobile group 2, when the position detection device 4 detects that the mobile group 2 reaches the self-locking position, the control device controls the limiting mechanism 5 to operate so that the limiting portion 51 can switch from the unlocking position to the locking position. In this way, the mobile group 2 can be limited to the self-locking position to prevent the mobile group 2 from sliding freely in the fixing cartridge 1 and colliding with the fixing cartridge 1. If it is necessary for the mobile group 2 to move and work, the control device controls the limiting portion 51 to switch to the unlocking position to avoid the mobile group 2, so as to solve the problem that existing lenses driven by a VCM are easily broken and the collision point is easily deformed.

As shown in FIG. 2 to FIG. 3, in some embodiments, the limiting portion 51 is provided on a side of the mobile group 2, the limiting portion 51 is rotatably provided around a rotation axis extending in the front-rear direction, and the limiting portion 51 is configured to switch between the locking position and the unlocking position during a rotation stroke. The limiting portion 51 is recessed with a clamping groove 51*a* with a notch facing the mobile group 2, and the clamping groove 51*a* is configured to clamp the mobile group 2 when the mobile group 2 moves to the self-locking position. In this way, when the mobile group 2 moves to the self-locking position, the limiting portion 51 rotates from the side next to the mobile group 2 to the side where the mobile group 2 is located, so that the front and rear end surfaces of the mobile group 2 are limited between the two side walls of the clamping groove 51*a*. When it is necessary to unlock, the limiting portion 51 is rotated and the clamping groove 51*a* rotates around the rotation axis, thereby disengaging from the mobile group 2 and switching to the side next to the mobile group 2.

In some embodiments, the limiting mechanism 5 further includes an installation base 52, a limiting shaft 511 and a driving mechanism 53. The limiting shaft 511 extends along the front-rear direction and is rotatably mounted on the installation base 52 to rotate around the rotation axis extending along the front-rear direction. A periphery of the limiting shaft 511 protrudes outward to form two beams 512 spaced apart in the front-rear direction, the clamping groove 51*a* is formed between the two beams 512, and the limiting shaft 511 is configured to form the limiting portion 51. The driving mechanism 53 is drivingly connected to the limiting shaft 511 to drive the limiting shaft 511 to rotate. The limiting mechanism 5 is fixed on the inner wall surface of the fixing cartridge 1 through the installation base 52. When there are a plurality of mobile groups 2, a plurality of limiting portions 51 need to be provided, the limiting shaft 511 is set to be longer, and the number of beams 512 can be set to match the number of the mobile group 2, that is, two beams 512 are provided for each mobile group 2. A clamping groove 51*a* may be formed between two adjacent beams 512, and two adjacent mobile groups 2 may share the middle beam 512 to simplify the limiting structure.

In some embodiments, the periphery of the limiting shaft 511 is provided with transmission teeth 513. The driving mechanism 5 includes a motor 531 and a worm 532. The motor 531 is provided with an output shaft extending in an up-down direction. The worm 532 extends in the up-down direction and is coaxially connected to the output shaft. The worm 532 is meshed with the transmission teeth 513 to form a worm gear structure. When the motor 531 is working, the output shaft drives the worm 532 to rotate, and the worm 532 converts the up and down torque into the front and rear torque. In this way, the overall structure of the limiting mechanism 5 is compact, which is beneficial to minimize the zoom lens.

It can be understood that when the driving mechanism 3 is working normally and needs to be locked, the mobile group 2 can be driven to the self-locking position and then locked. Then, when the driving mechanism 3 is suddenly powered off and the mobile group 2 has not reached the self-locking position, the limiting mechanism 5 can also be controlled to operate so that the limiting shaft 511 rotates to the locking position. With the beam 512 extending, the mobile group 2 is in a position between the beam 512 and an end wall of the installation cavity. The free travel distance of the mobile group 2 is reduced, which can also effectively reduce the risk of crashing the mobile group 2.

Figure 5:
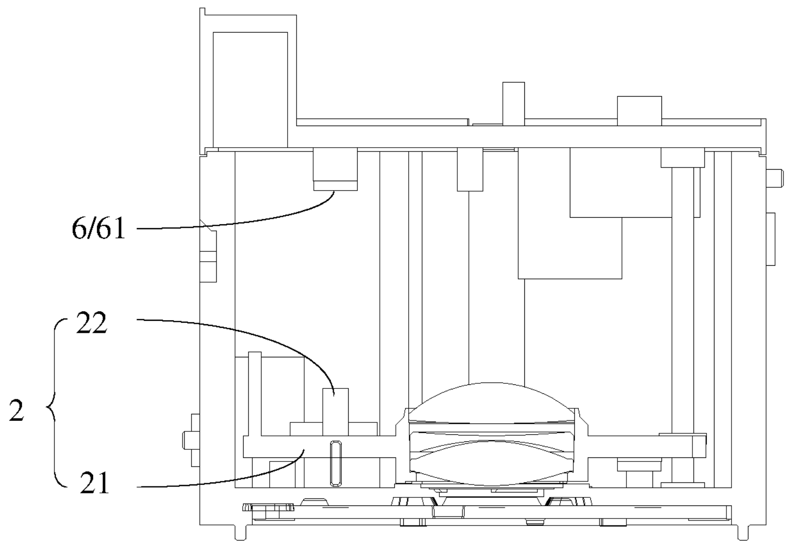
FIG. 5 is a schematic view of the mobile group located in a rear end point in FIG. 1.
Figure 6:
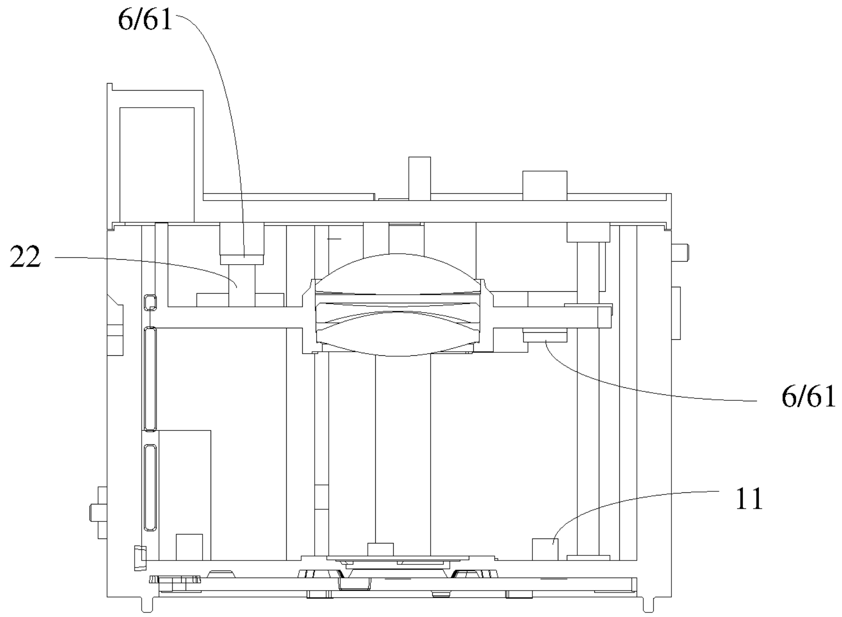
FIG. 6 is a schematic view of the mobile group located in a front end point in FIG. 1.
Figure 7:
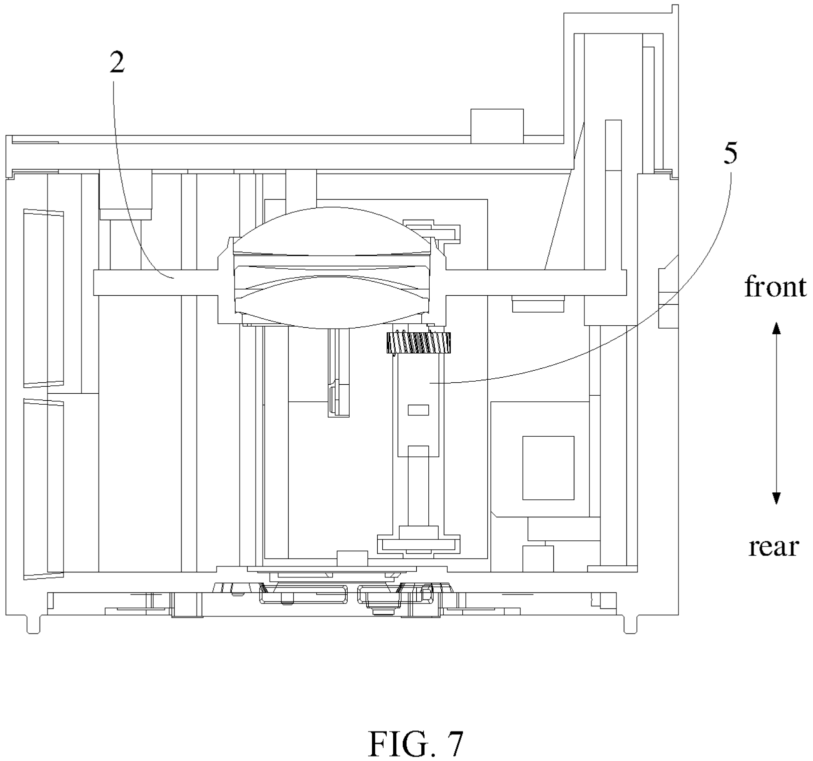
FIG. 7 is a schematic view from another viewpoint when the mobile group is located in the front end point in FIG. 6.

In order to further reduce the impact force suffered by the mobile group 2 during movement, as shown in FIG. 5 to FIG. 7, in some embodiments, the zoom lens assembly 100 further includes a buffer structure 6 provided in the fixing cartridge 1, the buffer structure 1 includes at least one buffer portion 61, the buffer portion 61 is provided on one of the installation cavity and the mobile group 2 to provide buffering when the mobile group 2 moves forward and backward. The buffer part 61 may be provided on the inner wall of the fixing cartridge 1, or may be provided on the mobile group 2. In this way, when the mobile group 2 moves to the extreme position, the buffer part 61 is provided as a cushion between the mobile group 2 and the fixing cartridge 1, thereby effectively reducing the damage caused by the collision force to the zoom lens assembly 100.

In order to provide better security for the zoom lens, in some embodiments, at least one of a front end surface of the mobile group 2 and a front end wall of the installation cavity is provided with the buffer portion 61; and/or, at least one of the rear end surface of the mobile group 2 and the rear end wall of the installation cavity is provided with the buffer portion 61. The buffer portion 61 may be provided on the front end surface of the mobile group 2, or may be provided on the front end wall of the installation cavity. In some embodiments, the front end surface of the mobile group 2 and the front end wall of the installation cavity can all be provided with the buffer portion 61. Two buffer portions 61 may be provided oppositely or may be staggered. Similarly, the buffer portion 61 can be installed at the rear end surface of the mobile group 2 and the rear end wall of the installation cavity at the same time or alternatively. In some embodiments, when the buffer portion 61 is provided on the mobile group 2, the position of buffer portion 61 can correspond to the position of the beam 512 when the limiting shaft 511 is in the locking position. In this way, no matter whether the driving mechanism 3 is in a sudden power outage situation, the buffer portion 61 can provide all-round safety guarantee.

In some embodiments, the buffer portion 61 includes foam. The foam can be adhered to the surface of the object, and the porous structure of the foam can provide buffering for the impact of the mobile group 2. In some embodiments, the buffer portion 61 can also be made of rubber, plastic, or other materials, and can be specifically designed according to the actual situation, which is not limited in these embodiments of the present application.

Furthermore, in order to control the position where the mobile group 2 collides with the fixing cartridge 1, in some embodiments, the mobile group 2 includes a main body 21 and a first protruding column 22 protruding from at least one end surface of the main body 21 in the front-rear direction, and the first protruding column 22 is provided correspondingly to the buffer portion 61; and/or, a second protruding column 11 protrudes from at least one end wall of the installation cavity in a front-rear direction, and the second protruding column 11 is provided correspondingly to the buffer portion 61. By arranging the protruding columns, the protruding columns are in contact with each other whether the mobile group 2 moves forward or backward, thus preventing the fragile or important positions of the mobile group 2 from colliding with the fixing cartridge 1 to reduce risk of damage.

In some embodiments, the position detection device 4 includes a detection part 41 and a sensing part 42, one of the detection part 41 and the sensing part 42 is directly or indirectly fixed to the fixing cartridge 1, and the other of the detection part 41 and the sensing part 42 is directly or indirectly fixed to the mobile group 2.

It can be understood that for the convenience and compactness of the layout, the detection part 41 and the sensing part 42 can be directly installed on the fixing cartridge 1 or the mobile group 2, or can be indirectly installed on the fixing cartridge 1 or the mobile group 2 through a conductive part 7 such as metal. The specific design can be based on the actual situation, and is not limited in these embodiments of the present application.

In some embodiments, the position detection device 4 includes a magnetic grating sensor. The magnetic grating sensor includes a magnetic head and a magnetic grating. The magnetic head forms the detection part 41, and the magnetic grating forms the sensing part 42. In this way, the position of the magnetic head can indirectly reflect the position of the mobile group 2. Through the relative movement between the magnetic head and the magnetic grating, the actual position of the mobile group 2 can be accurately detected.

In other embodiments, the position detection device 4 includes a grating sensor. The grating sensor includes a scale grating and an indication grating. The scale grating forms the detection part 41, and the indication grating forms the sensing part 42. In this way, the position of the indication grating can indirectly reflect the position of the mobile group 2. Through the relative movement between the indication grating and the scale grating, the actual position of the mobile group 2 can also be accurately detected.

In some embodiments, the driving mechanism 3 includes a driving coil 31 and a magnet structure 32, one of the fixing cartridge 1 and the mobile group 2 is directly or indirectly fixedly connected to the driving coil 31, the other of the fixing cartridge 1 and the mobile group 2 is directly or indirectly fixedly connected to the magnet structure 32, and the driving coil 31 is located in a magnetic field of the magnet structure 32 and is configured to generate an electromagnetic driving force with the magnet structure 32 when the driving coil 31 is energized.

In some embodiments, the driving coil 31 is directly fixed on the fixing cartridge 1 or the mobile group 2, and the magnet structure 32 can also be directly fixed on the mobile group 2 or the fixing cartridge 1. In other embodiments, for the convenience and compactness of the layout, the driving coil 31 is indirectly fixed on the fixing cartridge 1 or the mobile group 2 through a conductive part 7 such as a metal sheet, and the magnet structure 32 is also indirectly fixed on the fixing cartridge 1 or the mobile group 2 through the conductive part 7 such as a metal sheet. The specific design can be based on the actual situation, and is not limited in the embodiments of the present application.

The working principle of the driving mechanism 3 is: the driving coil 31 is provided in an annular shape and has two wire groups provided oppositely in the up and down direction. The magnet structure 32 includes at least one magnetic circuit component, and each of the magnetic circuit component includes a magnet. The magnet forms a magnetic field. When the driving coil 31 is energized, the wire group is in the magnetic field generated by the magnet. According to Ampere's rule, the wire group is acted upon Ampere's force, so that the Ampere force can be generated between the driving coil 31 and the magnet structure 32, thereby generating electromagnetic force to drive the mobile group 2 to move.

The above are only some embodiments of the present application, and are not intended to limit the scope of the present application. Under the concept of the present application, equivalent structural transformations made according to the description and drawings of the present application, or direct/indirect application in other related technical fields, are included in the scope of the present application.

What is claimed is:

1. A zoom lens assembly, comprising:

a fixing cartridge, provided with an installation cavity extending in a front-rear direction;

at least one mobile group, configured to install a lens and movably installed in the fixing cartridge in the front-rear direction, wherein the mobile group has a self-locking position during a movable stroke;

a driving mechanism, configured to drive the mobile group to move forward and backward;

a position detection device, configured to detect a relative position of the mobile group and the fixing cartridge in real time;

a limiting mechanism, provided in the fixing cartridge and comprising a limiting portion provided movably, wherein the limiting portion has a locking position and an unlocking position during a movable stroke, in the locking position, the limiting portion is configured to limit the mobile group to the self-locking position, and in the unlocking position, the limiting portion is configured to avoid the mobile group; and a control device, electrically connected to the driving mechanism, the position detection device and the limiting mechanism, and configured to control the driving mechanism and the limiting mechanism to work according to the position detection device;

wherein the position detection device comprises a grating sensor, the grating sensor comprises a scale grating and an indication grating, the scale grating forms a detection part, and the indication grating forms a sensing part; and one of the detection part and the sensing part is directly or indirectly fixed to the fixing cartridge, and the other of the detection part and the sensing part is directly or indirectly fixed to the mobile group.

2. The zoom lens assembly of claim 1, wherein the limiting portion is provided on a side of the mobile group, the limiting portion is rotatably provided around a rotation axis extending in the front-rear direction, and the limiting portion is configured to switch between the locking position and the unlocking position during a rotation stroke; and the limiting portion is recessed with a clamping groove with a notch facing the mobile group, and the clamping groove is configured to clamp the mobile group when the mobile group moves to the self-locking position.

3. The zoom lens assembly of claim 2, wherein the limiting mechanism further comprises:

an installation base;

a limiting shaft, extending along the front-rear direction and rotatably mounted on the installation base to rotate around the rotation axis extending along the front-rear direction, wherein a periphery of the limiting shaft protrudes outward to form two beams spaced apart in the front-rear direction, the clamping groove is formed between the two beams, and the limiting shaft is configured to form the limiting portion; and the driving mechanism, drivingly connected to the limiting shaft to drive the limiting shaft to rotate.

4. The zoom lens assembly of claim 3, wherein the periphery of the limiting shaft is provided with transmission teeth;

the driving mechanism comprises:

a motor provided with an output shaft extending in an up-down direction; and a worm extending in the up-down direction and coaxially connected to the output shaft, wherein the worm is meshed with the transmission teeth to form a worm gear structure.

5. The zoom lens assembly of claim 1, further comprising a buffer structure provided in the fixing cartridge, wherein the buffer structure comprises at least one buffer portion, the buffer portion is provided on one of the installation cavity and the mobile group to provide buffering when the mobile group moves forward and backward.

6. The zoom lens assembly of claim 5, wherein at least one of a front end surface of the mobile group and a front end wall of the installation cavity is provided with the buffer portion; and/or, at least one of a rear end surface of the mobile group and a rear end wall of the installation cavity is provided with the buffer portion.

7. The zoom lens assembly of claim 5, wherein the buffer portion comprises a foam.

8. The zoom lens assembly of claim 5, wherein the mobile group comprises a main body and a first protruding column protruding from at least one end surface of the main body in the front-rear direction, and the first protruding column is provided correspondingly to the buffer portion; and/or, a second protruding column is configured to protrudes from at least one end wall of the installation cavity in a front-rear direction, and the second protruding column is provided correspondingly to the buffer portion.

9. The zoom lens assembly of claim 1, wherein the driving mechanism comprises a driving coil and a magnet structure, one of the fixing cartridge and the mobile group is directly or indirectly fixedly connected to the driving coil, the other of the fixing cartridge and the mobile group is directly or indirectly fixedly connected to the magnet structure, and the driving coil is located in a magnetic field of the magnet structure and is configured to generate an electromagnetic driving force with the magnet structure when the driving coil is energized.

* * * * *